US012651683B2

(12) United States Patent
Tokieda et al.

(10) Patent No.: US 12,651,683 B2
(45) Date of Patent: Jun. 9, 2026

(54) ELECTRONIC COMPONENT

(71) Applicant: Murata Manufacturing Co., Ltd.,
Nagaokakyo (JP)

(72) Inventors: Kojiro Tokieda, Nagaokakyo (JP);
Hideyuki Suzuki, Nagaokakyo (JP);
Koichi Yamada, Nagaokakyo (JP);
Miki Sasaki, Nagaokakyo (JP)

(73) Assignee: **MURATA MANUFACTURING CO.,
LTD.**, Kyoto (JP)

( * ) Notice: Subject to any disclaimer, the term of this
patent is extended or adjusted under 35
U.S.C. 154(b) by 447 days.

(21) Appl. No.: 18/523,992

(22) Filed: Nov. 30, 2023

(65) Prior Publication Data

US 2024/0096524 A1     Mar. 21, 2024

Related U.S. Application Data

(63) Continuation of application No.
PCT/JP2022/023651, filed on Jun. 13, 2022.

(30) Foreign Application Priority Data

Jun. 15, 2021     (JP) ................................. 2021-099625

(51) Int. Cl.
*H01C 1/14*          (2006.01)
*H01C 1/142*         (2006.01)
(Continued)
(52) U.S. Cl.
CPC ......... *H01C 1/1413* (2013.01); *H01C 1/1406*
(2013.01); *H01C 1/142* (2013.01);
(Continued)

(58) Field of Classification Search
CPC .... H01C 1/1413; H01C 1/1406; H01C 1/142;
H01C 7/021; H01C 7/041; H01C 7/10;
(Continued)

(56) References Cited

U.S. PATENT DOCUMENTS 9,779,873 B2 * 10/2017 Kim ...................... H01G 4/248
2012/0229952 A1    9/2012 Kim
(Continued)

FOREIGN PATENT DOCUMENTS

JP          2001044066       *  2/2001
JP          2005197530  A      7/2005
(Continued)

OTHER PUBLICATIONS

JP-2001044066 translation (Year: 2001).*
International Search Report in PCT/JP2022/023651, mailed Sep. 6,
2022, 3 pages.
Written Opinion in PCT/JP2022/023651, mailed Sep. 6, 2022, 3
pages.

*Primary Examiner* — Kyung S Lee
(74) *Attorney, Agent, or Firm* — Keating & Bennett, LLP

(57) ABSTRACT

An electronic component includes a ceramic body, and an
external electrode on the ceramic body, the external elec-
trode includes a base layer continuously covering an end
surface of the ceramic body and a portion of a side surface
bordering the end surface, and a plating layer covering the
base layer, the ceramic body includes a recess open on the
side surface, an opening of the recess includes a pair of
edges, one edge of the opening is located within a covered
region on the side surface covered with the base layer, and
the other edge of the opening is spaced away from the
covered region.

20 Claims, 6 Drawing Sheets

(51) Int. Cl.

| | | |
|---|---|---|
| *H01C 7/02* | (2006.01) | |
| *H01C 7/04* | (2006.01) | |
| *H01C 7/10* | (2006.01) | |
| *H01G 4/232* | (2006.01) | |
| *H01G 4/30* | (2006.01) | |

(52) U.S. Cl.

CPC ............. *H01C 7/021* (2013.01); *H01C 7/041* (2013.01); *H01C 7/10* (2013.01); *H01G 4/2325* (2013.01); *H01G 4/30* (2013.01)

(58) Field of Classification Search

CPC . H01C 7/008; H01C 7/02; H01C 7/04; H01G 4/2325; H01G 4/30

See application file for complete search history.

(56) References Cited

U.S. PATENT DOCUMENTS

| | | |
|---|---|---|
| 2013/0294010 A1 | 11/2013 | Lee et al. |
| 2017/0040112 A1 | 2/2017 | Tanaka et al. |
| 2019/0098761 A1 | 3/2019 | Yoshida et al. |
| 2021/0082623 A1 | 3/2021 | Kim et al. |

FOREIGN PATENT DOCUMENTS

| | | |
|---|---|---|
| JP | 2007067026 A | 3/2007 |
| JP | 2012191165 A | 10/2012 |
| JP | 2013236045 A | 11/2013 |
| JP | 2017037930 A | 2/2017 |
| JP | 2019067793 A | 4/2019 |

* cited by examiner

ELECTRONIC COMPONENT

CROSS REFERENCE TO RELATED APPLICATIONS

This application claims the benefit of priority to Japanese Patent Application No. 2021-099625 filed on Jun. 15, 2021 and is a Continuation Application of PCT Application No. PCT/JP2022/023651 filed on Jun. 13, 2022. The entire contents of each application are hereby incorporated herein by reference.

BACKGROUND OF THE INVENTION

1. Field of the Invention

The present invention relates to an electronic component, and more particularly, to an electronic component including a ceramic body and an external electrode on a surface of the ceramic body.

2. Description of the Related Art

An electronic component including a body made of a semiconductor ceramic, a thin film layer (protective film) covering a surface of the body, and a pair of external electrodes disposed on a pair of end surface of the body is known (e.g., Japanese Patent Application Laid-Open No. 2019-67793). The external electrode includes a first electrode layer (base layer) disposed on the protective film, and a second electrode layer (plating layer) disposed so as to cover the first electrode layer.

A metal material that easily causes migration, such as Ag, is used for the base layer. The migration of the base layer can be suppressed by covering the base layer with the plating layer (e.g., Ni plating) as disclosed in Japanese Patent Application Laid-Open No. 2019-67793. However, since it is difficult to cover the entire base layer with the plating layer, a portion of the base layer is often exposed from the plating layer. In this case, a portion of the base layer is exposed to an external environment, and moisture brought in from the external environment may cause the migration from the base layer of one external electrode toward another external electrode.

SUMMARY OF THE INVENTION

Preferred embodiments of the present invention provide electronic components each able to reduce or prevent an occurrence of migration or reduce a degree of the migration, which is referred to as an "electronic component excellent in migration resistance".

An electronic component according to a preferred embodiment of the present invention includes a ceramic body, and an external electrode on the ceramic body, the external electrode includes a base layer continuously covering an end surface of the ceramic body and a portion of a side surface bordering the end surface, and a plating layer covering the base layer, the ceramic body includes a recess open on the side surface, an opening of the recess includes a pair of edges, one edge of the opening is located within a covered region on the side surface covered with the base layer, and another edge of the opening is spaced away from the covered region.

According to preferred embodiments of the present invention, migration of a base layer is able to be reduced or prevented by providing a recess on a side surface of a ceramic body, such that electronic components each excellent in migration resistance are able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
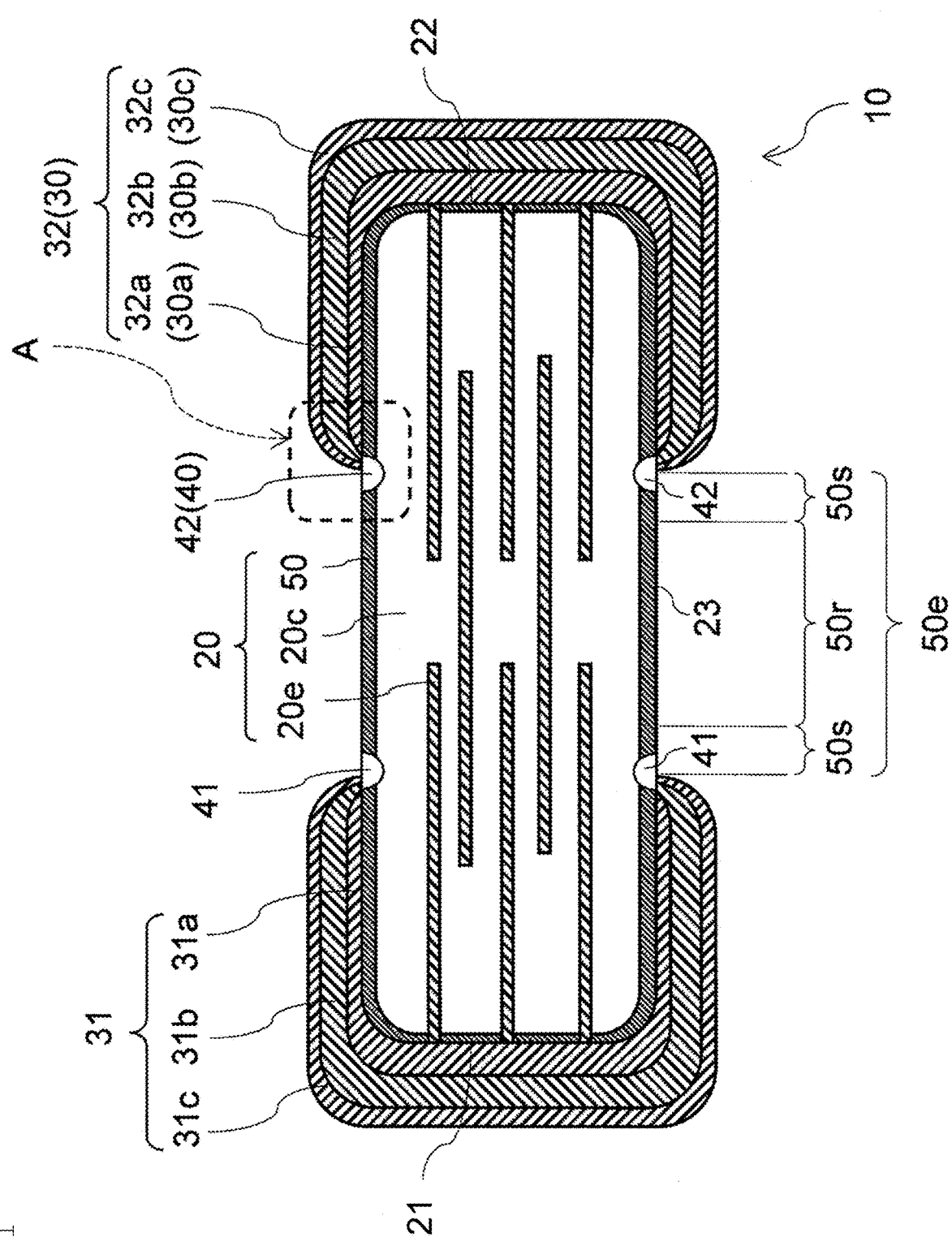
FIG. 1 is a schematic sectional view of a thermistor according to a preferred embodiment of the present invention.

FIG. 1 is a schematic sectional view of an electronic component 10 according to a preferred embodiment of the present invention, and illustrates a multilayer ceramic thermistor. A size of the electronic component 10 is not particularly limited, but may be, for example, a size of 0201 to 2012, and is a size of 0603 in a representative example.

The electronic component 10 includes a ceramic body 20 and external electrodes 30 provided on the ceramic body 20. The external electrodes 30 include a pair of external electrodes (a first external electrode 31, a second external electrode 32) provided on both ends of the ceramic body 20 in the electronic component 10 in FIG. 1.

Each of the external electrodes 30 includes a base layer 30a (a base layer 31a of the first external electrode 31 and a base layer 32a of the second external electrode 32 are illustrated in FIG. 1) and a plating layer 30b (a plating layer 31b of the first external electrode 31 and a plating layer 32b of the second external electrode 32 are illustrated in FIG. 1) covering the base layer. The plating layers may have a laminate structure including a plurality of layers, and the plating layers have, for example, a two-layer structure including the plating layer 30b (this may be referred to as a "first plating layer") and a second plating layer 30c covering the first plating layer 30b in FIG. 1.

The base layers 30a continuously cover end surfaces 21 and 22 of the ceramic body 20 and a portion of side surfaces 23 bordering the end surfaces 21 and 22.

The ceramic body 20 includes recesses 40 (first recesses 41 bordering the first external electrode 31 and second recesses 42 bordering the second external electrode 32) in the electronic component 10 according to the present preferred embodiment. The recesses 40 are opened on the side surfaces 23 of the ceramic body 20.

FIGS. 2 to 5 are an enlarged sectional views of a range A in FIG. 1, which illustrate various aspects of the recesses 40, the base layers 30*a*, and the plating layers 30*b* in the present preferred embodiment. For ease of explanation, the plating layers are illustrated as a single layer (including only the first plating layer 30*b*) in FIGS. 2 to 5. In a case of the plating layers including a plurality of layers, the plating layers 30*b* illustrated as a single layer include the plurality of plating layers.

The configuration in a vicinity of the recess 40 in the present preferred embodiment will be described with reference to FIG. 2. The recess 40 includes an opening 401 on the side surface 23 of the ceramic body 20, and the opening 401 includes a pair of edges 401*a* and 401*b*. One edge 401*a* of the opening 401 is located on the end surface 22 side of the ceramic body 20, and the other edge 401*b* is located on a central side of the ceramic body 20 in FIG. 1. A position of each edge has a relationship as described below with the base layer 30*a* covering the side surface 23 of the ceramic body 20.

Figure 2:
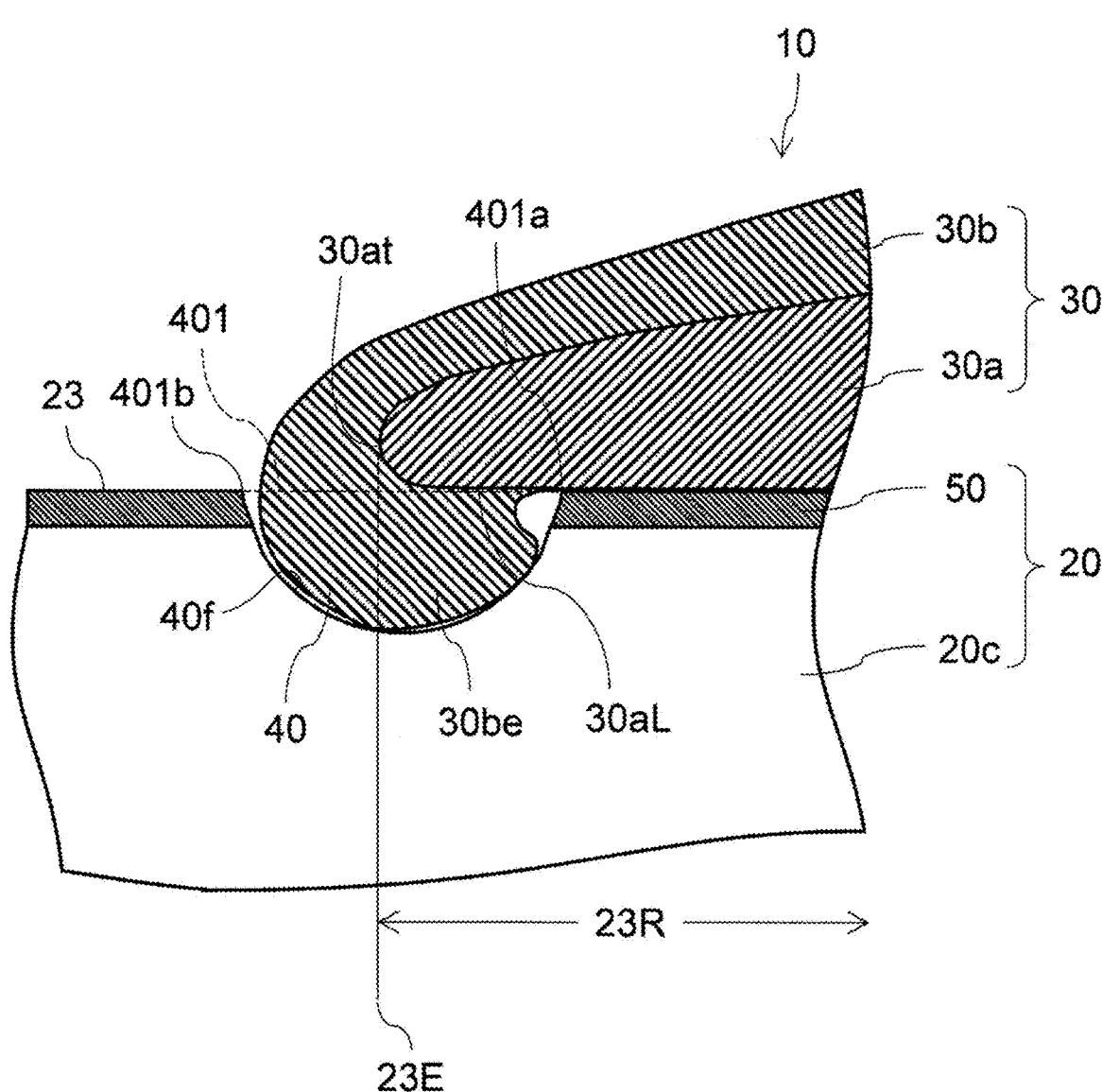
FIG. 2 is an enlarged sectional view of a range A in FIG. 1, and illustrates a preferred embodiment of a recess, a base layer, and a plating layer.

As illustrated in FIG. 2, a region of the side surface 23 of the ceramic body 20 covered with the base layer 30*a* is defined as a covered region 23R of the side surface 23. The one edge 401*a* of the opening 401 is located within the covered region 23R. The other edge 401*b* of the opening 401 is spaced away from the covered region 23R.

In other words, the recess 40 is provided on the side surface 23 of the ceramic body 20, and the base layer 30*a* is structured so that the base layer 30*a* covers the one edge 401*a* of the opening 401 of the recess 40 but does not cover the other edge 401*b*.

A surface distance (distance measured along a surface shape, e.g., irregularities, of the ceramic body 20) from the base layer 32*a* of one external electrode (the second external electrode 32 in FIG. 1) to another external electrode (the first external electrode 31 in FIG. 1) is increased by providing such recesses 40. This reduces or prevents an occurrence of migration of the base layer 32*a*.

Referring again to FIG. 2, the one edge 401*a* of the opening 401 of the recess 40 is located inside the covered region 23R with respect to a marginal portion 23E of the covered region 23R in the electronic component 10 illustrated in FIG. 2. As can be seen from FIG. 2, the marginal portion 23E of the covered region 23R is at a position corresponding to the edge 30*at* of the base layer 30*a*.

Figure 4:
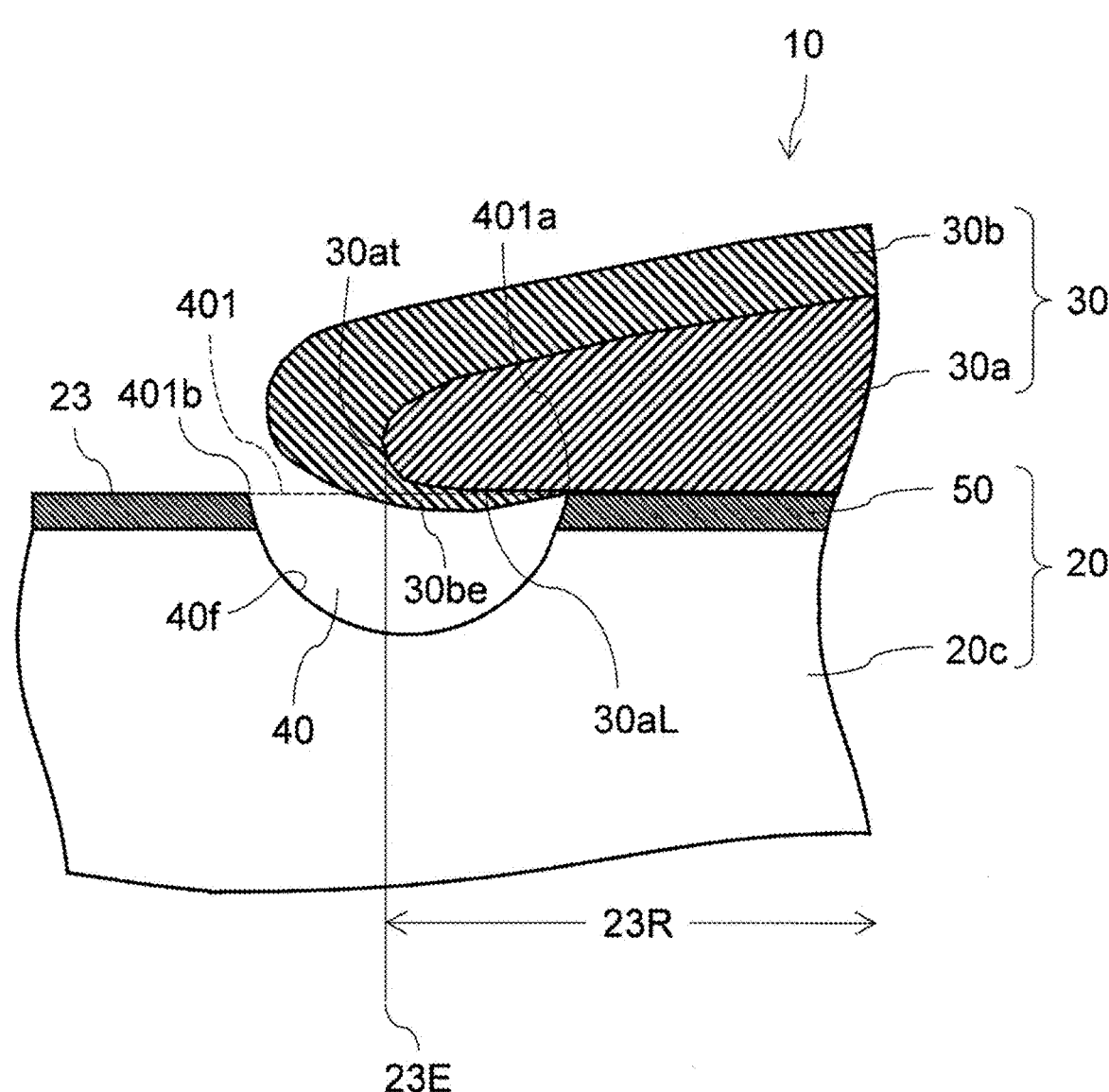
FIG. 4 is an enlarged sectional view of the range A in FIG. 1, and illustrates a preferred embodiment of a recess, a base layer, and a plating layer.

The marginal portion 23E of the covered region 23R of the side surface 23 and the one edge 401*a* of the opening 401 have the same or substantially the same positional relationship also in the electronic component 10 illustrated in FIG. 4.

When the edges of the opening 401 are provided as illustrated in FIGS. 2 and 4, a portion of the recess 40 is covered with the base layer 30*a*, and a remainder of the recess 40 is exposed from the base layer 30*a*.

When the one edge 401*a* of the opening 401 is provided in this manner, a lower surface 30*a*L of the base layer 30*a* is exposed in the recess 40 in the vicinity of the edge 30*at* of the base layer 30*a*. Then, the lower surface 30*a*L of the base layer 30*a* can be covered with the plating layer 30*b*. That is, the plating layer 30*b* can widely cover the vicinity of the edge 30*at* of the base layer 30*a*. As a result, an advantageous effect of reducing or preventing the migration of the base layer 30*a* is obtained.

Figure 3:
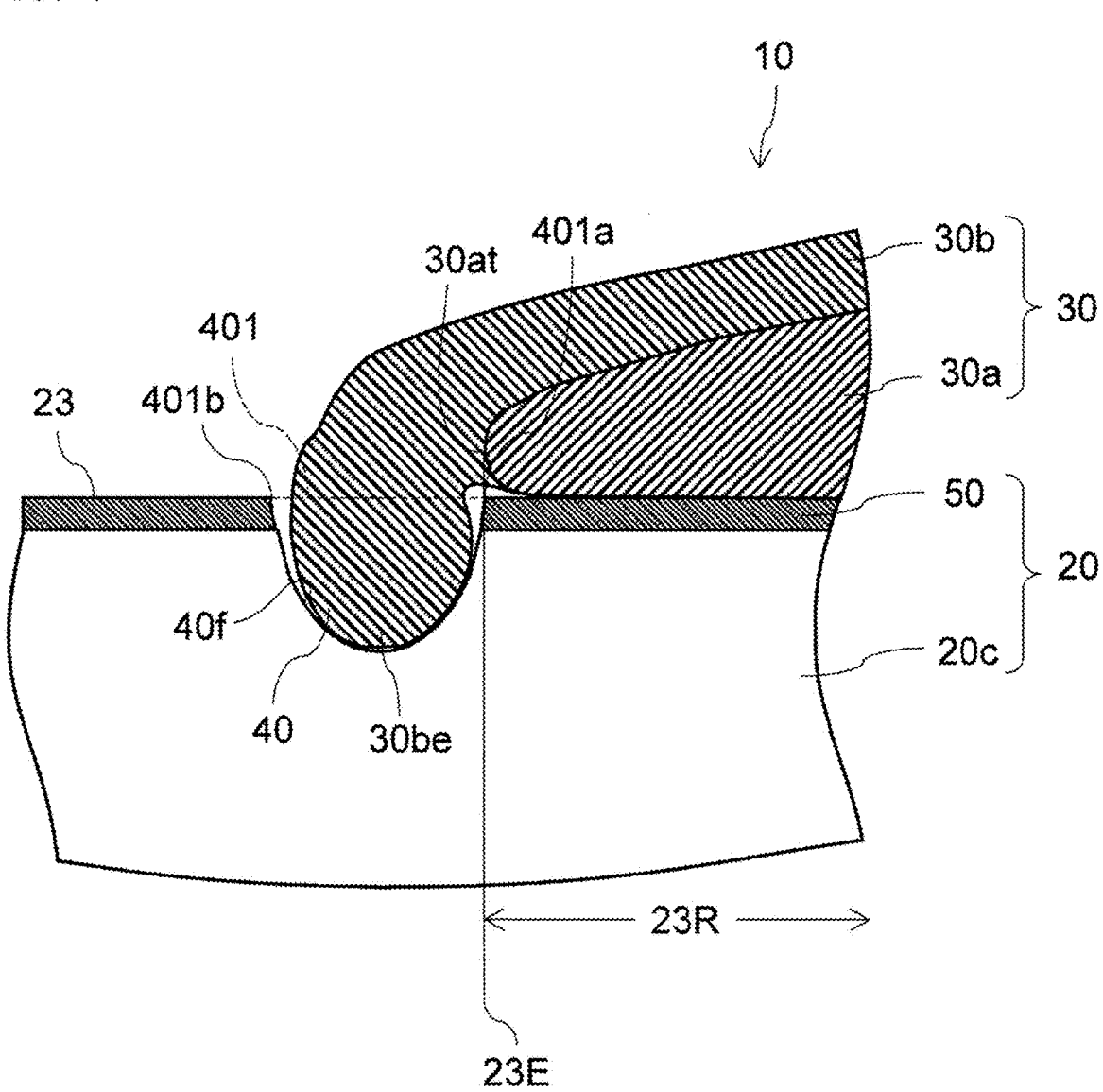
FIG. 3 is an enlarged sectional view of a range A in FIG. 1, and illustrates a preferred embodiment of a recess, a base layer, and a plating layer.

On the other hand, the one edge 401*a* of the opening 401 of the recess 40 may be located at the marginal portion 23E of the covered region 23R as in the electronic component 10 illustrated in FIG. 3. That is, the one edge 401*a* of the opening 401 may be located substantially just below the position of the edge 30*at* of the base layer 30*a* in the sectional view of FIG. 3.

Figure 5:
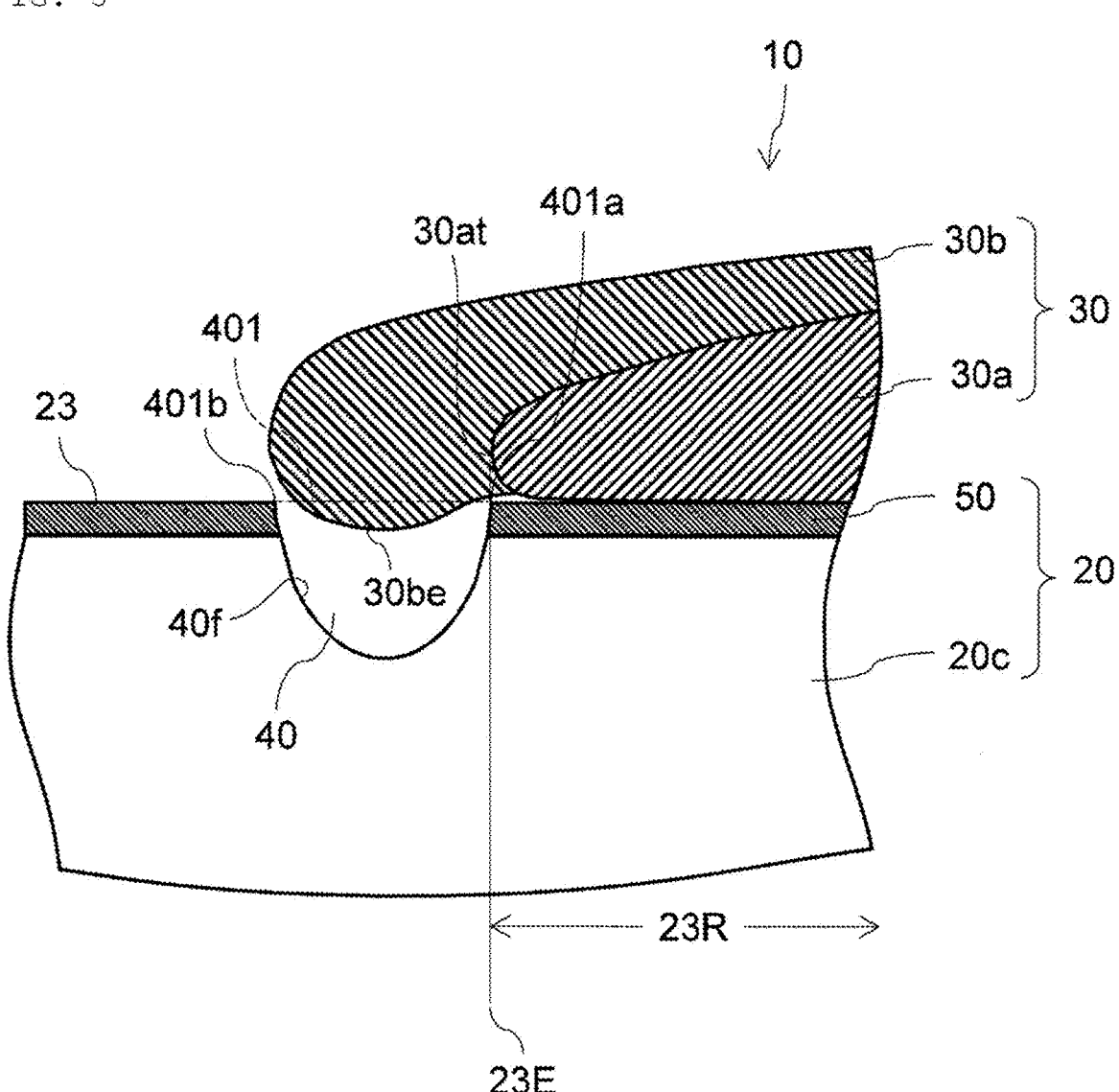
FIG. 5 is an enlarged sectional view of the range A in FIG. 1, and illustrates a preferred embodiment of a recess, a base layer, and a plating layer.

The marginal portion 23E of the covered region 23R of the side surface 23 and the one edge 401*a* of the opening 401 have the same or substantially the same positional relationship also in the electronic component 10 illustrated in FIG. 5.

When the edge of the opening 401 is provided as illustrated in FIGS. 3 and 5, an entire or substantially an entire portion of the recess 40 is exposed from the base layer 30*a*.

The base layer 30*a* is provided so that the other edge 401*b* of the opening 401 of the recess 40 and the base layer 30*a* of the external electrode 30 are not in contact with each other in any of FIGS. 2 to 5. As a result, when the base layer 30*a* is provided in an environment where the migration is likely to occur, the migration of the base layer 30*a* extends from the one edge 401*a* of the recess 40 to the other edge 401*b* of the opening 401 along the inner surface 40*f* of the recess 40. The surface distance measured along the surface is increased by providing the recess 40 compared with the surface distance when the recess 40 is not provided. Since the surface distance affects the occurrence of the migration, the occurrence of the migration of the base layer 30*a* can be reduced or prevented by increasing the surface distance.

In addition, as described below, the plating layer 30*b* can be thick in the vicinity of the edge 30*at* of the base layer 30*a* by providing the recess 40 without being disturbed by the ceramic body 20. The advantageous effect of reducing or preventing the migration of the base layer 30*a* can be ensured by thickening the plating layer 30*b*.

For example, referring to FIG. 2, the plating layer 30*b* includes an extending portion 30*be* that extends beyond the edge 30*at* of the base layer 30*a* and into the recess 40 so that at least a portion of the extending portion 30*be* is in contact with the inner surface 40*f* of the recess 40. That is, the extending portion 30*be* of the plating layer 30*b* extends into the recess 40 and to the inner surface 40*f* of the recess 40.

The plating layer 30*b* including the extending portion 30*be* the same as or similar to FIG. 2 is also illustrated in FIG. 3.

Since the plating layer 30*b* includes the extending portion 30*be* as illustrated in FIGS. 2 and 3, a path from the external environment to the base layer 30*a* is blocked by the extending portion 30*be* of the plating layer 30*b*. That is, since the extending portion 30*be* extending inside the recess 40 becomes a steric hindrance, the base layer 30*a* can be blocked from the external environment, which is highly effective in reducing or preventing the migration of the base layer 30*a*.

As another example, the plating layer 30*b* includes the extending portion 30*be* extending beyond the edge 30*at* of the base layer 30*a* to the one edge 401*a* of the opening 401 of the recess 40 in the electronic component 10 illustrated in FIG. 4. Although the extending portion 30*be* is not in contact with the inner surface 40*f* of the recess 40, it bulges toward the inside of the recess 40. In FIG. 4, since the extending portion 30*be* bulges in an inward direction (downward direction) of the recess 40, a lowermost end of the plating layer 30*b* is positioned below the lower surface 30*a*L of the base layer 30*a*.

The plating layer 30*b* including the extending portion 30*be* the same as or similar to FIG. 4 is also illustrated in FIG. 5.

Since the plating layer 30*b* includes the extending portion 30*be* as illustrated in FIGS. 4 and 5, the plating layer 30*b* in the vicinity of the edge 30*at* of the base layer 30*a* can be thickened, which can provide the advantageous effect of reducing or preventing the migration of the base layer 30a.

The depth of the recess 40 is preferably, for example, about 0.5 μm or more and about 5.0 μm or less, which prevents the electronic component 10 from defects caused by an existence of the recess 40 and can improve the advantageous effect of reducing or preventing the migration of the base layer 30a. The depth of the recess 40 is preferably, for example, about 1.0 μm or more and about 2.5 μm or less.

The ceramic body 20 may include a protective film 50 covering the surface of the ceramic body 20. When the ceramic body 20 includes the protective film 50, the external electrodes 30 are provided on the protective film 50 (FIGS. 1 to 5).

As can be seen from a non-limiting example of a manufacturing method described later, since the protective film 50 is formed before the recess 40 is formed, the inner surface 40f of the recess 40 is not normally covered with the protective film 50. The protective film 50 that has not been removed at the time of forming the recess 40 may slightly remain on the inner surface 40f of the recess 40 in the vicinity of the opening 401 of the recess 40. In this case, it is considered that the inner surface 40f of the recess 40 is not substantially covered with the protective film 50.

A thickness of the protective film 50 is preferably, for example, about 30 nm or more and about 500 nm or less, and more preferably about 70 nm or more and about 100 nm or less.

As illustrated in FIG. 1, when the electronic component 10 includes the pair of external electrodes 31 and 32 provided at both ends of the ceramic body 20, the protective film 50 includes exposed surfaces 50e exposed from the pair of external electrodes 31 and 32 between the external electrodes 31 and 32. Each of the exposed surfaces 50e preferably includes a pair of smooth surface regions 50s close to the external electrodes 31 and 32, and a rough surface region 50r located between the pair of smooth surface regions 50s and having surface roughness greater than that of the smooth surface region 50s. It is possible to reduce or prevent the plating layers 30b from spreading on the surface of the protective film 50 at the time of forming the plating layers 30b by providing the smooth surface regions 50s in the vicinity of the external electrodes 31 and 32. In addition, since the surface distance between the pair of external electrodes 31 and 32 can be increased by providing the rough surface region 50r between the pair of smooth surface regions 50s, the advantageous effect of reducing or preventing the migration of the base layer 30a can be expected.

As an example of a method of forming the rough surface region 50r on the protective film 50, regions of the surface of the protective film 50 excluding the vicinity of the external electrodes 31 and 32 are roughened after forming the protective film 50 having a smooth surface. As another example of method of forming the rough surface region 50r, there is the method of roughening the surface of the ceramic layer 20c of the ceramic body 20 before forming the protective film 50, and then forming the protective film 50. Since the protective film 50 is thin, surface quality (e.g., fine irregularities, etc.) of the ceramic layer 20c is directly reflected on the surface of the protective film 50.

When a separation distance between the external electrodes 31 and 32 is, e.g., about 170 μm or more and about 430 μm or less, a width of each smooth surface region 50s can be, e.g., about 20 μm or more and about 100 μm or less.

As illustrated in FIG. 1, the ceramic body 20 may have the laminate structure including ceramic layers (e.g., semiconductor ceramic layers) 20c and internal electrodes 20e.

A ceramic material (e.g., a ceramic semiconductor material) for the ceramic layer 20c is selected depending on a type of the desired electronic component 10.

For example, in the case of an NTC thermistor having a negative resistance temperature characteristic, the ceramic semiconductor material includes a P-type semiconductor having the negative resistance temperature characteristic as a main component. The P-type semiconductor is, for example, a ceramic including manganese oxide as the main component, and includes nickel oxide, cobalt oxide, alumina, iron oxide, titanium oxide, zirconium oxide, copper oxide, zinc oxide, and the like as a sub-component.

In the case of a multilayer capacitor, for example, dielectric materials such as $BaTiO_3$, $CaTiO_3$, $SrTiO_3$, $CaZrO_3$, $(BaSr)TiO_3$, $Ba(ZrTi)O_3$, and $(BiZn)Nb_2O_7$ are used as the ceramic material.

The material of the internal electrode 20e is not particularly limited as long as it is conductive, and examples thereof include Ag, Cu, Pt, Ni, Al, Pd, and Au, and particularly, Ag, Cu, and Ni are preferable.

Electronic components suitable for preferred embodiments of the present invention include chip ceramic electronic components such as thermistors, varistors and capacitors including, for example, positive characteristic (or positive temperature coefficient, PTC) thermistors and negative characteristic (or negative temperature coefficient, NTC) thermistors. In these electronic components, the material of the ceramic layer 20c is selected depending on the required characteristics.

As will be described later, there are mainly two methods for forming the recess 40 in the electronic component 10 according to the present preferred embodiment, which are, for example, the method of dissolving with a plating solution during a plating step (chemical processing) and the method of performing cutting processing by laser processing or the like before the plating step (mechanical processing).

The chemical processing is preferable in that the step can be simplified because the recess 40 can be formed simultaneously with formation of the plating layer. However, the material of the ceramic layer needs to be dissolved in the plating solution in the chemical processing. Examples of the electronic component including the ceramic layer (semiconductor ceramic layer) 20c that can be chemically processed include a thermistor.

Examples of the electronic component to which the chemical processing cannot be applied include a varistor. In the case of the varistor, the mechanical processing is performed instead of the chemical processing. The mechanical processing is preferable in that the recess 40 can be formed in any electronic component because it is not necessary to consider solubility in the plating solution. When the recess 40 is formed on the side surface 23 of the ceramic body 20 by the mechanical processing, the recess 40 is formed before the plating step.

Method for Manufacturing Electronic Component 10

Hereinafter, a non-limiting example of a method for manufacturing the electronic component 10 according to the present preferred embodiment of the present invention will be described using the thermistor illustrated in FIG. 1 as an example. A state in the vicinity of the recess 40 in each step will be described with reference to FIGS. 6A to 6D.

Preparation of Ceramic Body 20

First, predetermined amounts of ceramic raw materials such as, for example, $BaCO_3$, $TiO_2$, $PbO$, $SrCO_3$, and $CaCO_3$ and a semiconducting agent such as, for example, $Er_2O_3$ are weighed as raw materials of the ceramic body. An oxide of at least one rare earth element selected from, for example, Y, La, Ce, Pr, Nd, Sm, Eu, Gd, Tb, Dy, Ho, Er, Tm, Yb, and Lu may be used instead of $Er_2O_3$ as the semiconducting agent. In addition to the ceramic raw material and the semiconducting agent described above, for example, a characteristic improving agent such as $Mn_2O_3$ or a sintering additive such as $SiO_2$ may be used as a raw material of the ceramic body. Each weighed raw material is charged into a ball mill together with a grinding medium such as, for example, partially stabilized zirconia (PSZ) (hereinafter, also referred to as PSZ ball) and pure water, and wet-mixed and ground. The obtained mixture is calcined at a predetermined temperature (e.g., about 1000° C. to about 1200° C.) to provide a calcined powder.

An organic binder is added to the obtained calcined powder, and the resulting mixture is subjected to a wet mixing treatment to form a slurry, and then subjected to molding processing using, for example, a doctor blade method or the like to prepare a ceramic green sheet. Next, a conductive paste for the internal electrodes is applied to the surface of the ceramic green sheet to form an internal electrode pattern. The conductive paste for the internal electrode can be prepared, for example, by dispersing Ni metal powder and the organic binder in an organic solvent. The paste for the internal electrode may be applied by, for example, screen printing or the like. A predetermined number of the ceramic green sheets on which the internal electrode patterns are thus formed are laminated, and then the ceramic green sheets on which the internal electrode patterns are not formed are sandwiched between upper and lower sides and subjected to pressure bonding to prepare a laminated body. This laminated body is cut into a predetermined size, then subjected to a binder removal treatment, and then fired at the predetermined temperature (e.g., about 1200° C. to about 1400° C.) in the air, thus providing the laminated body having the laminate structure including the ceramic layers 20c and the internal electrodes 20e.

Figures 6A, 6B, 6C, 6D:
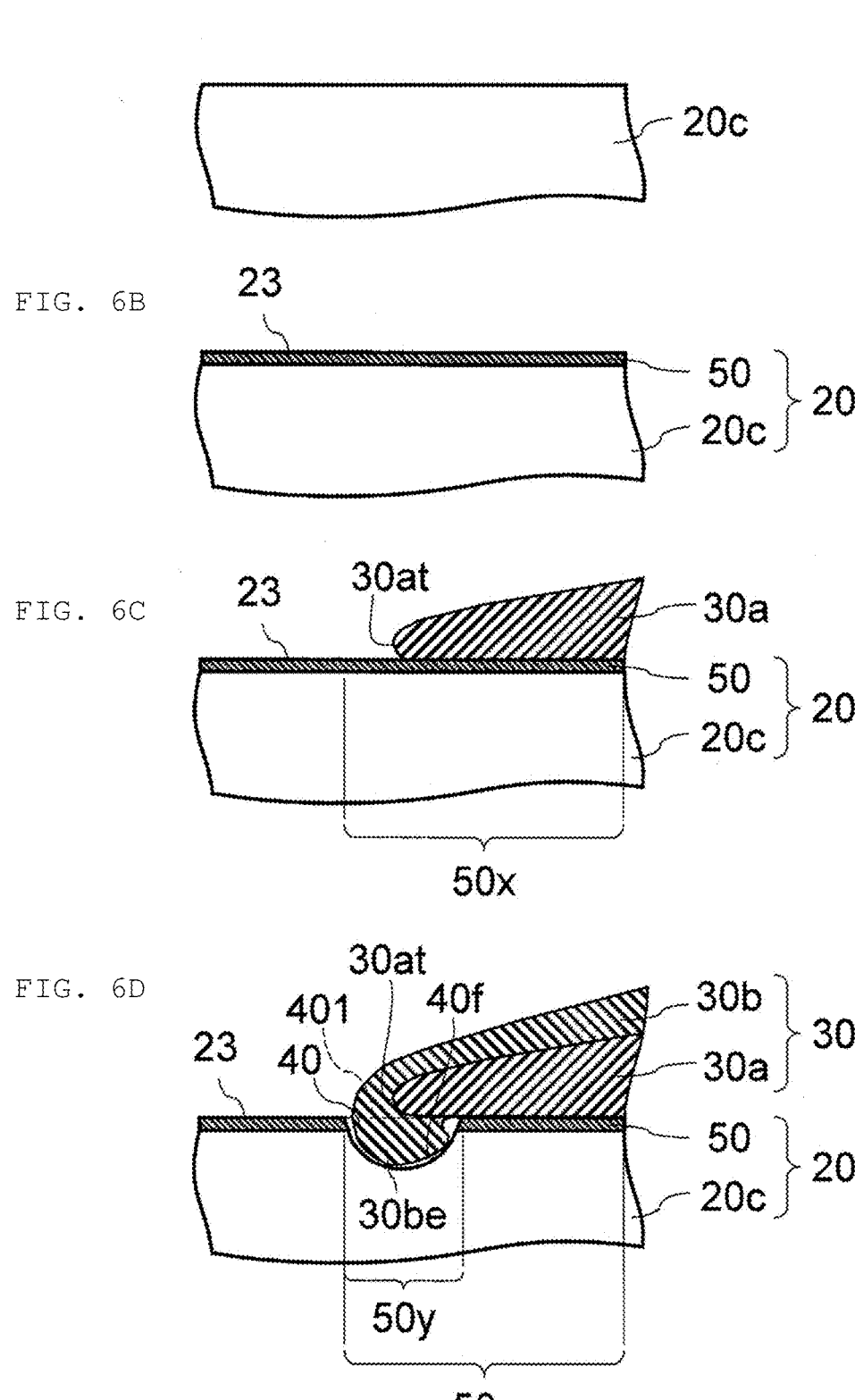
FIGS. 6A to 6D are enlarged sectional views for explaining a non-limiting example of a method for manufacturing an electronic component according to a preferred embodiment of the present invention.

FIG. 6A illustrates only the ceramic layer 20c in the obtained laminated body.

Next, the protective film 50 is formed on an entire or substantially an entire surface of the laminated body (FIG. 6B). At this time, the protective film 50 is formed so as to cover not only the ceramic layers 20c but also the internal electrodes 20e.

The protective film 50 can be formed of, for example, an insulating material such as glass. The protective film 50 made of the glass can be formed by a thin film production method using a solution. As the thin film production method, for example, a sol-gel method, a metal-organic decomposition (MOD) method, a chemical solution deposition (CSD) method, or the like can be used. A raw material coating film of the protective film 50 is formed on the surface of the laminated body, and then subjected to a heat treatment to obtain the protective film 50 of the glass derived from the coating film. A temperature and time of the heat treatment can be, for example, about 300° C. or higher and about 1100° C. or lower and, for example, about 10 to 60 minutes. The temperature of the heat treatment is particularly preferably, for example, about 400° C. or higher and about 1,000° C. or lower.

As a result, the ceramic body 20 including the ceramic layers 20c, the internal electrodes 20e, and the protective film 50 is obtained.

Formation of Base Layer 30a

As shown in FIG. 1, the base layers 31a and 32a (collectively referred to as "base layer 30a") are formed so as to cover from the end surface to a portion of the side surface 23 of the ceramic body 20.

The base layer 30a can be formed of, for example, Ag, AgPd, Cu, or the like.

The base layer 30a is formed by, for example, various thin film forming methods, various printing methods, a dip method, or the like. For example, when the base layer 30a is formed by the dip method, the conductive paste is applied to both end surfaces of the ceramic body, and then the conductive paste is baked. The conductive paste includes, for example, the organic solvent, metal particles, and the glass. A baking temperature is, for example, about 840° C. When baking processing is performed, the internal electrode 20e penetrates the protective film 50 and is electrically connected to the base layer 30a (fire through).

The thickness of the protective film 50 is preferably, for example, about 30 nm or more and about 500 nm or less, the ceramic layer 20c of the ceramic body 20 can be protected at the time of forming the plating layer, and the internal electrode 20e and the base layer 30a can be reliably conducted by the fire through.

Thereafter, for example, the region of the protective film 50 in contact with the base layer 30a and the region in the vicinity of the edge 30at of the base layer 30a are altered by, for example, scratching by an external force or chemically reacting with chemicals. (As illustrated in FIG. 6C, these regions are collectively referred to as "alteration region 50x".) The strength of the protective film 50 in the alteration region 50x is lower than that of the protective film 50 at other positions.

Formation of Plating Layer 30b

The plating layer 30b (first plating layers 31b and 32b in FIG. 1) is formed so as to cover the surface of the base layer 30a. The plating layer 30b can be formed by, for example, electroplating of one or more metal materials selected from Ni, Sn, Pd, and Au.

While the plating layer 30b is formed, the region of the protective film 50 that is not covered with the base layer 30a is in contact with the plating solution. At this time, when plating conditions (e.g., type, concentration, temperature, and the like of plating solution) at the time of forming the plating layer 30b are appropriately controlled, a portion of the protective film 50 in contact with the plating solution (i.e., the vicinity of the edge 30at of the base layer 30a), in which the protective film 50 is deteriorated and the strength is weakened, can be dissolved and removed to expose the ceramic layer 20c. The exposed ceramic layer 20c is dissolved in the plating solution to form the recess 40. As the dissolution of protective film 50 and ceramic layer 20c progresses, the region in which the protective film 50 is removed (removal region 50y of the protective film 50) expands. For example, the protective film 50 is removed up to the lower side of the edge 30at of the base layer 30a as illustrated in FIG. 6D. When the removal region 50y of the protective film 50 expands, the region of the opening 401 of the recess 40 also expands accordingly.

The plating layer 30b is formed beyond the edge 30at of the base layer 30a as illustrated in FIGS. 2 to 5. The portion exceeding the edge 30at (extending portion 30be) has a different structure depending on the plating conditions (in particular, the plating time). For example, when the plating time is long, the extending portion 30be grows larger as it comes into contact with the inner surface 40f of the recess 40 as illustrated in FIGS. 2 and 3. On the other hand, when the plating time is not so long, the extending portion 30*be* bulges toward the inside of the recess 40 but does not contact the inner surface 40*f* as illustrated in FIGS. 4 and 5. When the extending portion 30*be* as illustrated in FIGS. 2 and 3 is provided, although the advantageous effect of reducing or preventing the migration of the base layer 30*a* is provided, the plating time increases, thus a manufacturing cost increases. Therefore, it is preferable to determine whether the extending portion 30*be* as illustrated in FIGS. 2 and 3 or the extending portion 30*be* as illustrated in FIGS. 4 and 5 in consideration of required performance and the manufacturing cost.

The plating layer (first plating layer) 30*b* and the second plating layer 30*c* can be formed by known plating methods, and, for example, barrel plating using balls can be used. In the barrel plating, the balls come into contact with the exposed surface 50*e* of the protective film 50 illustrated in FIG. 1, and the protective film 50 can be roughened. In addition, since the balls cannot contact the surface of the protective film 50 in the vicinity of the external electrode 30 due to the external electrode 30 being an obstacle, the surface of the protective film 50 remains as the smooth surface (i.e., the smooth surface region 50*s* can be formed).

The plating layer may have the two-layer structure as illustrated in FIG. 1. In this case, after the plating layers (first plating layers) 31*b* and 32*b* are formed, the second plating layers 31*c* and 32*c* are formed so as to cover the first plating layers 31*b* and 32*b*.

The first plating layers 31*b* and 32*b* can be formed, for example, by the electroplating of at least one of Ni and Cu. The second plating layers 31*c* and 32*c* can be formed by, for example, the electroplating of Sn.

Method for Manufacturing Electronic Component (Modification)

A modification of a preferred embodiment of the present invention is different from the manufacturing method according to the present preferred embodiment described above in that the recesses 40 are formed by mechanical processing.

First, similarly to the manufacturing method according to the present preferred embodiment, the ceramic body 20 is formed. Then, the recesses 40 are formed on the side surfaces 23 of ceramic body 20 by the mechanical processing such as laser processing, for example. Thereafter, similarly to the manufacturing method according to the present preferred embodiment, the base layers 30*a* and the plating layers 31*b* (and the second plating layers 31*c*) are sequentially formed.

According to the present modification, when the ceramic layers 20*c* included in the ceramic body 20 are formed of a material that is not dissolved in the plating solution, the electronic component 10 including the recesses 40 can also be manufactured.

As described above, although the method for manufacturing the electronic component according to the preferred embodiment of the present invention and the modification thereof have been described by taking the PTC thermistor having the internal electrode as the example, other electronic components such as, for example, the PTC thermistor, the NTC thermistor, the varistor, and the capacitor not having the internal electrode can also be appropriately manufactured based on the description of the present description.

EXAMPLE

An electronic component (thermistor) having a structure as illustrated in FIG. 1 was produced by the method for manufacturing the electronic component 10 according to the preferred embodiment. Materials, dimensions, and the like of the thermistor were as follows:

Electronic component: multilayer ceramic thermistor

Size of electronic component: size of 0603, prismatic type

Material of ceramic layers: ceramic containing manganese oxide as a main component, and including nickel oxide, cobalt oxide, and iron oxide.

Material of base layer: Ag

Material of plating film: Ni for first plating layer, Sn for second plating layer Number of layers of plating film: two layers Material of protective film: amorphous glass having a thickness of about 100 nm The produced thermistor included a recess 40, a base layer 30*a*, and a plating layer 30*b* (two-layer structure including a first plating layer and a second plating layer) as illustrated in FIG. 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a ceramic body; and
an external electrode on the ceramic body, wherein
the external electrode includes:
a base layer continuously covering an end surface of the ceramic body and a portion of a side surface bordering the end surface; and
a plating layer covering the base layer;
the ceramic body includes a recess open on the side surface, and an opening of the recess includes a pair of edges;
one edge of the pair of edges of the opening is located within a covered region on the side surface covered with the base layer; and
another edge of the pair of edges of the opening is separated from the covered region.

2. The electronic component according to claim 1, wherein
the one edge is located at a marginal portion of the covered region; and
an entire or substantially an entire portion of the recess is exposed from the base layer.

3. The electronic component according to claim 1, wherein
the one edge is located inside a marginal portion of the covered region; and
a portion of the recess is covered with the base layer, and a remainder of the recess is exposed from the base layer.

4. The electronic component according to claim 1, wherein
the plating layer includes an extending portion extending to the one edge of the opening of the recess beyond an edge of the base layer; and
the extending portion bulges outward into the recess so as not to be in contact with an inner surface of the recess.

5. The electronic component according to claim 1, wherein the plating layer includes an extending portion extending beyond an edge of the base layer and into the recess so that at least a portion of the extending portion is in contact with an inner surface of the recess.

6. The electronic component according to claim 1, wherein the recess has a depth of about 0.5 μm or more and about 5.0 μm or less.

7. The electronic component according to claim 1, wherein the ceramic body includes a protective film covering a surface of the ceramic body;

the external electrode is provided on the protective film; and the inner surface of the recess is exposed from the protective film.

8. The electronic component according to claim 7, wherein the protective film has a thickness of about 30 nm or more and about 500 nm or less.

9. The electronic component according to claim 7, wherein the electronic component includes a pair of the external electrodes at both ends of the ceramic body;

the protective film includes an exposed surface exposed from the pair of external electrodes between the pair of external electrodes; and the exposed surface includes a pair of smooth surface regions close to each of the pair of external electrodes, and a rough surface region between the pair of smooth surface regions and having surface roughness greater than surface roughness of the smooth surface region.

10. The electronic component according to claim 9, wherein a width of each of the smooth surface regions is about 20 μm or more and about 100 μm or less.

11. The electronic component according to claim 7, wherein the protective film has a thickness of about 70 nm or more and about 100 nm or less.

12. The electronic component according to claim 1, wherein the ceramic body has a laminate structure including a semiconductor ceramic layer and an internal electrode.

13. The electronic component according to claim 12, wherein the semiconductor ceramic layer includes manganese oxide as a main component.

14. The electronic component according to claim 13, wherein the semiconductor ceramic layer further includes at least one of nickel oxide, cobalt oxide, alumina, iron oxide, titanium oxide, zirconium oxide, copper oxide, or zinc oxide as a sub-component.

15. The electronic component according to claim 12, wherein the internal electrode includes at least one of Ag, Cu, or Ni.

16. The electronic component according to claim 1, wherein the electronic component is a thermistor.

17. The electronic component according to claim 11, wherein the thermistor is an NTC thermistor.

18. The electronic component according to claim 1, wherein the plating layer includes a first plating layer and a second plating layer covering the first plating layer.

19. The electronic component according to claim 1, wherein the recess has a depth of about 1.0 μm or more and about 2.5 μm or less.

20. The electronic component according to claim 1, wherein the ceramic body includes at least one of $BaTiO_3$, $CaTiO_3$, $SrTiO_3$, $CaZrO_3$, $(BaSr)TiO_3$, $Ba(ZrTi)O_3$, or $(BiZn)Nb_2O_7$.

\* \* \* \* \*